United States Patent Office 3,460,145
Patented Aug. 5, 1969

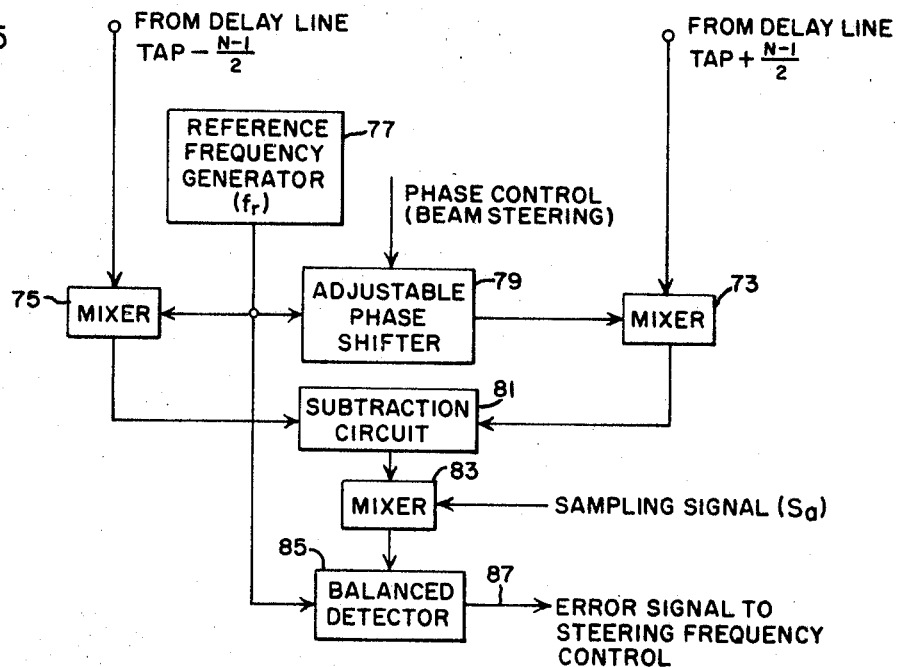
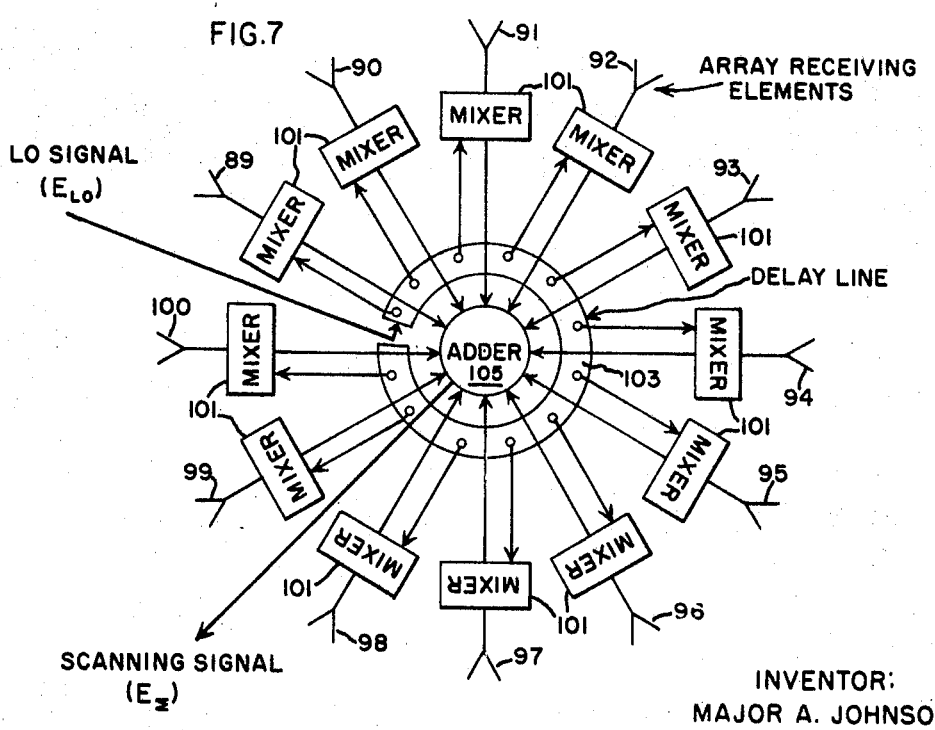

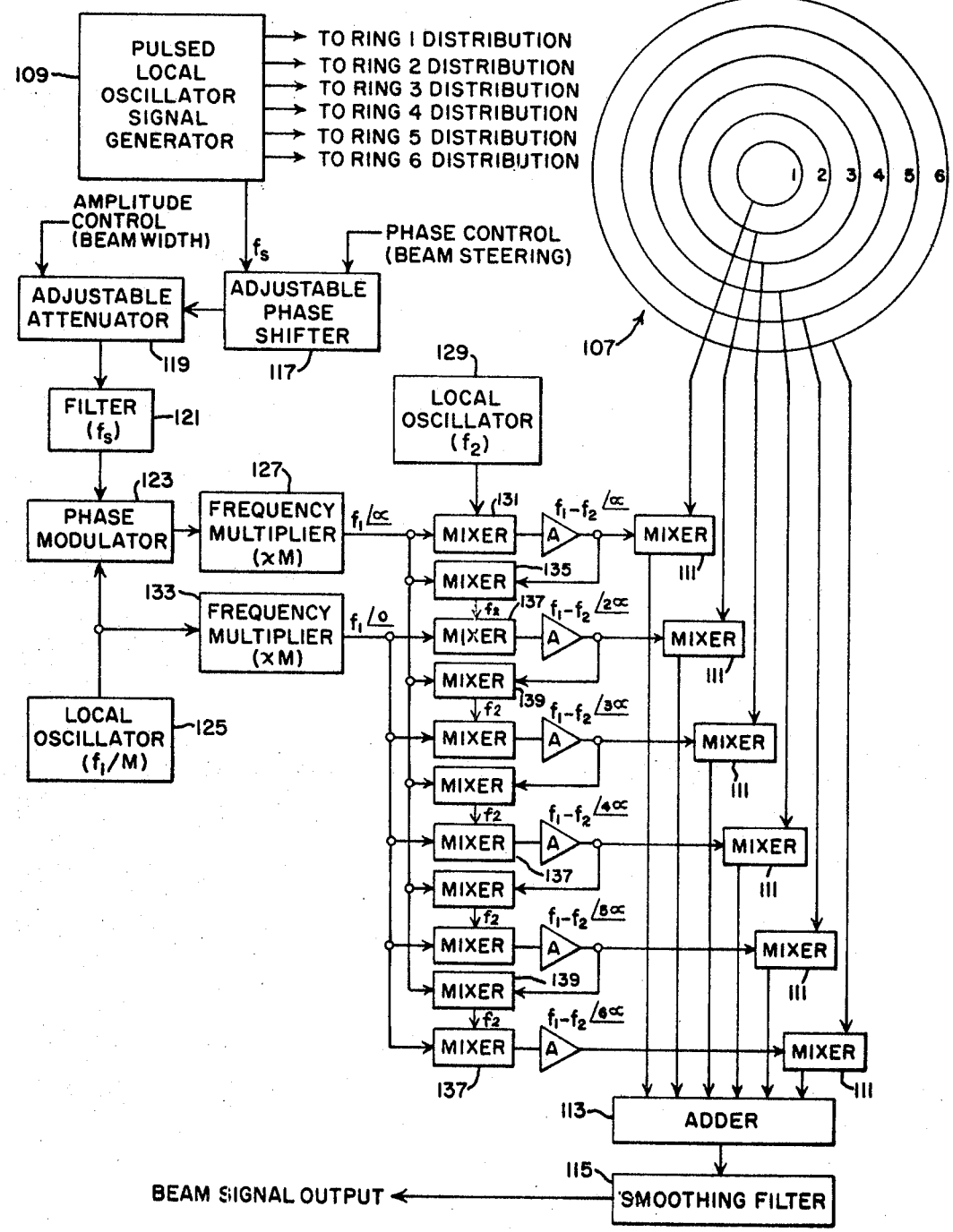

3,460,145
ELECTRONIC SCANNING SYSTEM FOR WAVE ENERGY BEAM FORMING AND STEERING WITH RECEPTOR ARRAYS
Major A. Johnson, Cazenovia, N.Y., assignor to General Electric Company, a corporation of New York
Filed Mar. 14, 1968, Ser. No. 713,054
Int. Cl. H04b 7/02, 7/04
U.S. Cl. 343—100                    9 Claims

ABSTRACT OF THE DISCLOSURE

This disclosure describes electronic scanning means for forming and steering one or a plurality of receive beams with an antenna or other receptor array comprising a plurality of wave energy receiving elements ordered in various arrays of both linear and circular form. As described, beam forming is accomplished by first converting and combining all the element signals received from each wave energy source into an IF signal of character such that the IF signal frequency provides a measure of beam direction. Thus a number of simultaneously received beams at different angles will produce a corresponding number of IF signals of different frequencies multiplexed onto a single scanning signal, with the principal components for each received signal grouped around a scanning signal frequency corresponding to its direction of arrival. Each such signal thus multiplexed may be separated and processed to shape and steer the individual beam represented thereby, by mixing them with sampling signals the frequencies of which determine beam position and the bandwidths of which determine beam width. Different processors for accomplishing this beam shaping and steering are described, as are extensions of the beam forming and steering system to arrays of different forms including one of multiple concentric rings.

Field of the invention

The invention herein described was made in the course of or under a contract, or subcontract thereunder, with the Department of the Air Force.

This invention relates to object locating systems and more particularly to object locating systems of the type employing a plurality of wave energy receiving elements disposed in an ordered array so as to establish a narrow directive sensitivity pattern which can be varied to indicate the direction of incident propagated wave energy, such as compressional waves in the case of sonar systems or electromagnetic waves in the case of radar and communications systems. Still more particularly, this invention is directed to electronic scanning means for use with receptor arrays, enabling the shaping and steering of one or any desired plurality of individual receive beams with good precision of control of beam shape and pointing angle, and with a minimum of system and component complexity. The electronic scanning systems of the invention are adapted to use with receptor arrays in which the array elements are arranged in rectilinear order to form linear or planar arrays, and offer advantages also with ring and multiple ring arrays. The invention further comprehends inter-ring phase steering circuitry for the multiple ring array, providing particularly advantageous implementation for this embodiment of the invention as will hereinafter be described.

Description of the prior art

Among the early patents descriptive of electronic scanning receiver systems for radar, sonar and other object locating systems using a plurality of wave energy receptor elements arranged in ordered array, in combination with means for forming and steering the received beam or direction of maximum sensitivity of the array, are Patent Nos. 2,852,772, Gitzendanner, and 3,012,244, Langenwalter, both of common assignee herewith. Gitzendanner describes and claims a ring array system incorporating beam forming and steering means for establishing a conically rotating directive sensitivity pattern varied electrically with time to provide a spiral scanning action over the field of view covered. Langenwalter describes and claims apparatus for predeterminably displacing the relative phase of signals received by individual propagated wave energy receiving elements of a linear array, and for periodically synchronizing electrically this relative phase displacement of the individual received signals to effect a variation in the direction of composite sensitivity pattern of the array.

The prior art also includes a number of proposals for electronic scanning systems capable of simultaneous scan operation, i.e., capable of forming simultaneously a plurality of receive beams each of different pointing angle. One such system, for example, is described in a paper by H. E. Shanks entitled "A New Technique for Electronic Scanning," published in the IRE Transactions on Antennas and Propagation, dated March 1961.

The present invention is directed to electronically scanned arrays which are of the general kind described in these earlier patents and publications, but which afford additional capabilities and advantages in areas of system performance, complexity and cost. Specifically, the electronic steering systems of this invention are capable of forming and steering a plurality of receive beams and of controlling beam shape and pointing angle of the individual beams with good accuracy and precision of control while minimizing the complexity of system implementation which would normally be expected to follow from such multiplication of receive beam capability. The different embodiments of the present invention as described hereinafter adapt well to a variety of applications and afford certain additional advantages specific to each, as will be fully explained in their respective descriptions.

Summary of the invention

In its preferred embodiment the invention comprises a plurality of wave energy receptor elements arranged in ordered array, as for example in linear or ring array. For receive beam forming, means are provided for generating a harmonic spectrum, as by a pulsed LO (local oscillator), and deriving from each of its spectral lines a set of signals of different phase slope across the set determined in accordance with the frequency of that spectral line. This may be accomplished as by applying the pulsed LO signal to a delay line having a plurality of spaced taps each of which outputs a composite or multiplexed signal comprising all the spectral harmonics each with a phase displacement dependent upon its frequency. Each such composite signal is mixed with the received signal from one receptor element, to generate a set of IF frequencies having the characteristic that the phase slope for each set will depend upon the direction of arrival of the received signal as well as upon its frequency. These signals are combined in an adder with given phase slope, thus reinforcing those IF frequencies having that phase slope while at least partially cancelling those with other phase slopes, to yield a scanning signal comprising components grouped around a frequency corresponding to direction of arrival of the received wave energy.

To steer the beam thus formed and control its width, the IF signals which are of line character as combined in the adder are further processed by mixing with a sampling signal of character such that the product yields an output signal of a single frequency corresponding to that of the received beam. In one preferred embodiment of the invention described this sampling signal is generated by translating the frequencies of the pulsed LO spectrum by mixing with a variable frequency signal which controls beam steering, passing the translated spectrum through a bandpass filter which determines the number of spectral lines passed and thus controls beam width, and retranslating the spectrum to its original frequencies before mixing with the scanning signal. In other embodiments the sampling signal generator is differently arranged but again incorporates means for beam steering and beam width control which may be changed or made variable according to the requirements of the particular problem. For forming of multiple beams simultaneously, only the sampling signal generator need be duplicated so that multiple beam capability may be achieved by duplication only of its relatively smaller number of elements. In accordance with the invention this basic beam forming and steering system may readily be extended to planar arrays, as for example a multiple concentric ring array in which the beam forming and steering system of the invention affords improved control of beam shape and permits greater thinning of elements as hereinafter explained.

Brief description of the drawings

The foregoing and other features and advantages of the invention will be more fully understood by reference to the following detailed description when read in conjunction with the accompanying drawings, wherein:

FIGURES 3 and 4 are block diagrams each showing an alternative embodiment of the receive beam shaping and steering portion of the electronic scanning system of FIGURE 1;

FIGURE 5 is a block diagram of an alternative embodiment of receive beam steering control suitable for use with the electronic scanning system of FIGURE 1;

FIGURE 7 is a block diagram of a single ring array; and

FIGURE 8 is a block diagram of a multiple ring array including means for generating individual beam forming signals for each of the rings.

Description of prepared embodiments

Figure 1:
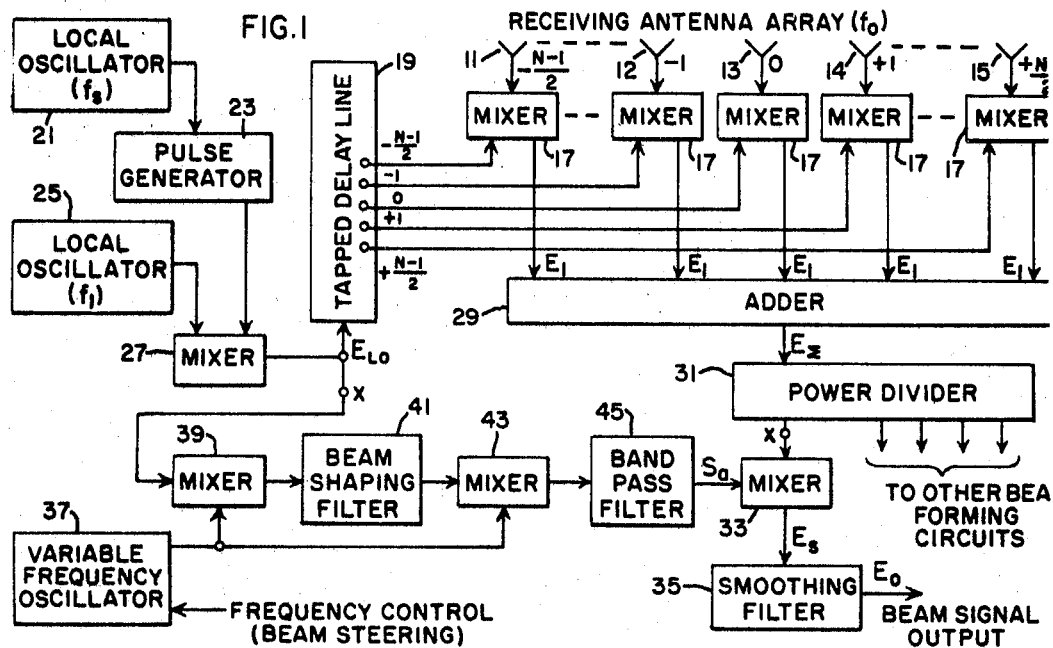
FIGURE 1 is a block diagram of the electronic scanning system of the invention as applied to a linear array.

With continued reference to the drawings, wherein like reference numerals have been used throughout to designate like elements, FIGURE 1 illustrates one preferred embodiment of the electronic scanning system of this invention as applied to a receiving system including a phase steered array antenna with electronic beam forming and steering. The antenna comprises a plurality N of dipole or other receptor elements 11–15 arranged in ordered array, as for example in linear array disposed symmetrically about the center receptor element 13 as illustrated.

The received signal at frequency $f_0$ sensed by each of the receptor elements 11–15 constitutes one input to one of the bank of mixers 17 having as their second inputs a set of beam forming signals distributed to them by a transmission line 19, which as shown may comprise a delay line having N taps at points along the line spaced correspondingly to the spacing between the associated receptor elements 11–15. The signal input to this delay line 19 is provided by a pulsed LO signal generator including a local oscillator 21 and a pulse generator 23. The LO signal at frequency $f_s$ drives the pulse generator to produce a plurality of harmonics ($f_s, 2f_s, 3f_s \ldots$) of the basic frequency. The harmonic spectrum thus generated may be transmitted directly to the distribution line 19 or as illustrated may have each of its component frequencies translated to more convenient level as by mixing with a carrier at frequency $f_1$ from local oscillator 25, in a mixer 27.

Each of the spectral harmonics in the composite or multiplexed signal $E_{LO}$ which is applied to the tapped delay line 19 will be differentially delayed therein in accordance with its frequency, and there accordingly will appear across the delay line output taps N distinct sets of signals with each such set being of one of the spectral line frequencies and having a different phase slope dependent upon its frequency. It follows that the output signal as taken from each delay line tap will consist of a plurality of harmonically related frequency components each corresponding to one spectral line, and the phase of each such signal component will depend both upon its frequency and the distance down the delay line of the particular tap at which it is taken.

The signals thus generated at the delay line taps constitute beam forming signals which combine in the mixers 17 with the received signals from the associated receptor elements 11–15 to yield a set of IF signals having the characteristic that the phase slope for each different IF frequency of the set will depend upon the signal direction of arrival as well as upon its frequency. Therefore, when the output signals from mixers 17 all are combined in a linear adder 29 with given phase slope, those IF frequencies having that phase slope will be reinforced while those with other phase slopes will cancel, and the output signal $$E_\Sigma$$

will include for each given received signal a number of signal components grouped around a particular frequency corresponding to the direction of arrival of that received signal.

The scanning signal $$E_\Sigma$$

thus generated may be divided in a power divider 31 if more than one beam is to be formed, as will be further explained hereinafter, and the signal then combines in a mixer 33 with a sampling signal $S_a$ to yield a sampling mixer output signal $E_s$ which after filtering in a smoothing filter 35 constitutes the beam signal output $E_0$. The sampling signal $S_a$ is generated from the spectral line signal $E_{LO}$ generated by the pulsed local oscillator 21–27 by a beam shaping and steering circuit which may take any of several forms.

In the embodiment illustrated in FIGURE 1, this beam shaping and steering circuit comprises a variable frequency steering oscillator 37 the output frequency of which may be varied by an input BEAM STEERING signal of suitable character. The steering oscillator output combines in a first mixer 39 with the pulsed LO signal $E_{LO}$ to effect a translation of each of the $E_{LO}$ spectral line frequencies, and the combined signal then is processed through a beam shaping filter 41 the bandwidth of which imposes a limit on the number of spectral harmonics passed and in this way controls the width of the receive beam. The signal then is again mixed at 43 with the beam steering oscillator signal to restore the original spectral line frequencies, after which the signal is again filtered at 45 to remove undesired modulation products, and transmitted to the mixer 33 in which it combines with the scanning signal $$E_\Sigma$$

As previously noted, the scanning signal $$E_\Sigma$$

and sampling signal $S_a$ after mixing at 33 are passed through a final filter 35 which passes only those frequencies corresponding to the original signal, at frequency $E_0$.

Figure 2:
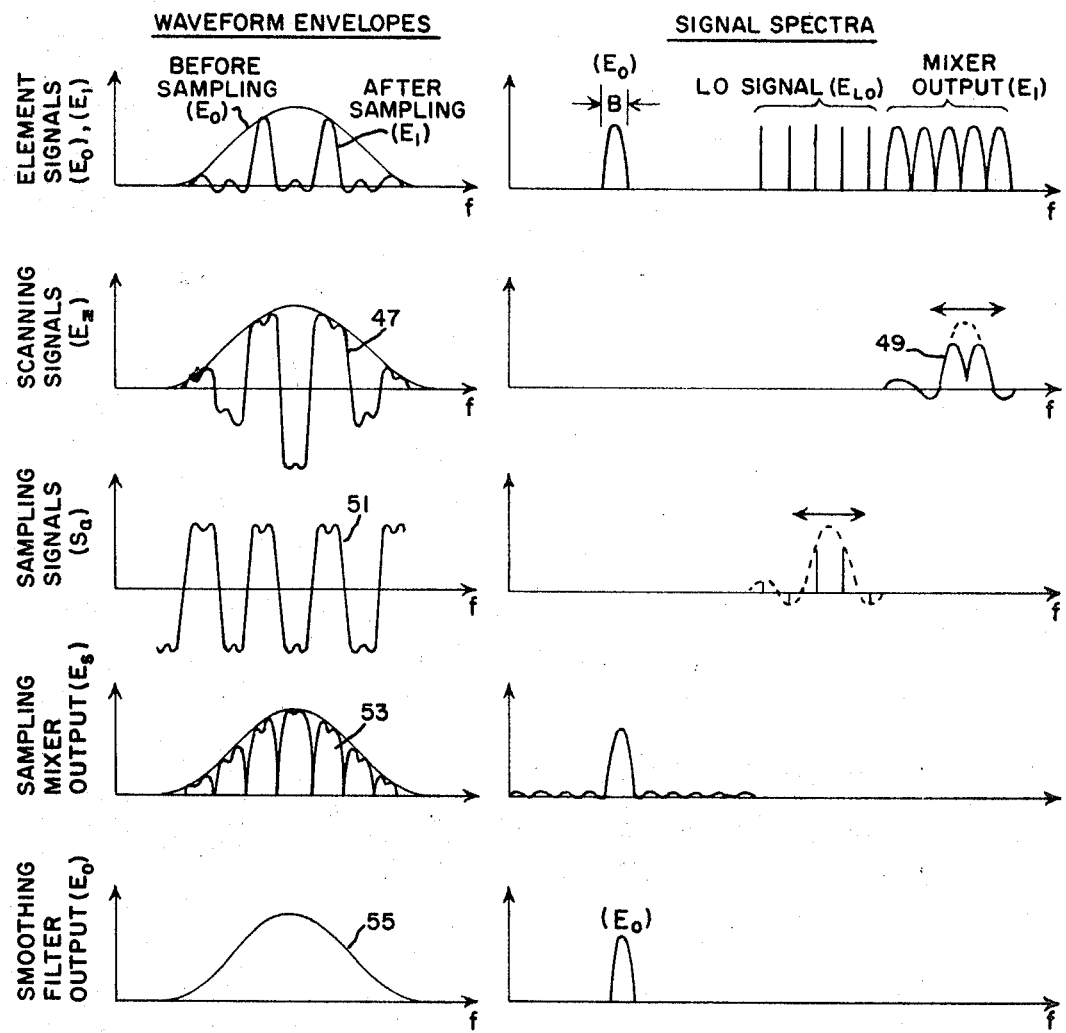
FIGURE 2 illustrates waveform envelopes and signal spectra at various points within the electronic scanning system of FIGURE 1.

The beam shaping and steering operation just described and the nature and interrelationship of the signals produced in its course will perhaps most easily be understood by reference to FIGURE 2, which illustrates waveforms and spectra for signals at several points in the circuit of FIGURE 1, when considered together with the following analysis of circuit operation. With an incident signal which is of frequency $f_0$ (angular frequency $\omega_0$), which has a complex modulation $f(t)$, and which is incident on the array from direction $\gamma$, the $n^{th}$ element signal may with certain simplifying assumptions be written as $$_nE_e = We_n f(t) e^{j(\omega_0 t + nkd\eta)} \quad (1)$$

where $k=2\pi/\lambda$, $\eta=\cos \gamma$, and $We_n$ represents element weighting which could be introduced as by elemental attenuators. The pulsed LO signal transmitted from mixer 27 to the delay line 19 may be represented as $$E_{LO} = \sum_m a_m e^{j(\omega_1 + m\omega_s)t} \quad (2)$$

With time referenced to the center tap of the delay line 19, the pulsed LO signal at the $n^{th}$ tap then will be $$_nE_{LO} = \sum_m a_m e^{j(\omega_1 + m\omega_s)(t - n\tau)} \quad (3)$$

where $\tau$ is the delay between successive taps. To provide signal sampling at as high a rate as possible without starting a new set of samples before the old is finished, the total delay (T) across delay line 19 is made equal to the period of the sampling pulse train, which requires that $$N\tau = \frac{1}{f_s} \text{ or } \omega_s \tau = \frac{2\pi}{N} \quad (4)$$

In order to avoid any phase steering effects due to the frequency $f_1$ this frequency preferably is chosen and maintained so that its product with $\tau$ is an integral number of cycles, i.e., so that $\omega_1 \tau = 2\pi P$ where P is any integer. Variation of the $f_1 \tau$ product could be calibrated out, but generally it is preferable to hold this product constant which may conveniently be accomplished as by phase locking the $f_1$ oscillator to the delay line. So long as the $f_1 \tau$ product is constant the local oscillator signal at the $n$th tap is given by $$_nE_{LO} = e^{j\omega_1 t} \sum_m a_m e^{jm\left[\omega_s t - \frac{2\pi n}{N}\right]} \quad (5)$$

The sum frequency output of the $n$th element sampling mixer then will be given by $$_nE_1 = {_nE_{LO}} X {_nE_e}$$

$$= We_n f(t) e^{j(\omega_0 + \omega_1)t} \sum_m a_m e^{jm\omega_s t} e^{jn\left[kd\eta - \frac{2\pi m}{N}\right]} \quad (6)$$

The added output will, therefore, be $$E_\Sigma = \sum_n E_1$$

$$= f(t) e^{j(\omega_0 + \omega_1)t} \sum_m a_m e^{jm\omega_s t} \sum_n W_{en} e^{jn\left[kd\eta - \frac{2\pi m}{N}\right]} \quad (7)$$

For $We_n = 1$, this may be seen to be equal to $$E_\Sigma = f(t) e^{j(\omega_0 + \omega_1)t} \sum_m a_m e^{jm\omega_s t} \frac{\sin N/2\left[kd\eta - \frac{2\pi m}{N}\right]}{\sin 1/2\left[kd\eta - \frac{2\pi m}{N}\right]} \quad (8)$$

Referring now to FIGURE 2, the signals incident on receptor elements 11–15 illustrated in the uppermost waveforms in FIGURE 2 show the element signals before sampling $E_0$ and after sampling $E_1$, together with the spectra for these respective signals and for the pulsed LO signal $E_{LO}$ which combines with the received signal to yield the mixer output signal $E_1$. The general character of the waveform defined by Equation 8 is illustrated at 47 on the second line of FIGURE 2, from which its most significant attribute may be seen to be the sin $Nx$/sin $x$ function which relates the beam angular position (as represented by $\eta$) to the lines of the spectral representation (as designated by $m$). In essence, this represents a modulation of the line spectrum of the sampled signal with the antenna pattern function.

As the target direction $\eta$ increases, the frequency of maximum spectral content increases, and vice versa, as indicated by the two-headed arrow above the spectrum shown at 49 for the scanning signal $$E_\Sigma$$

Each of the spectral lines included in this spectrum may be shown to correspond to a particular beam direction, these directions occurring at intervals of $kd\Delta\eta = 2\pi/N$ or $\Delta\eta = \lambda/Nd$, which is the distance to the first null of the sin $Nx$/sin $x$ pattern and corresponds to a Shannon sampling interval of the far-field pattern coordinate, $\eta$. This means that samples effectively are summed over the full Shannon sampling interval, so full gain may be realized for signals arriving at any direction, i.e., with any value of $\eta$, whether or not it corresponds exactly to one of the spectral lines.

The time envelop function of this scanning signal $E_\Sigma$ as illustrated at 47 in FIGURE 2 will vary, however, depending upon the relationship of $\eta$ to its particular values corresponding to the spectral lines. If $\eta$ is exactly equal to one of these particular values and uniform element weighting is used, the scanning signal may be seen to consist of $f(t)$ modulated on a single spectral line, since all other spectral lines will fall at nulls of the sin $Nx$/sin $x$ function. When $\eta$ lies between these values there will generally be an added amplitude and phase modulation repeating at an $f_S$ rate as shown, though this superimposed modulation will not affect signal gain for the reason previously noted.

The frequency scanning signal $$E_\Sigma$$

thus characterized may also be visualized by considering separately the effect of each of the spectral components of the pulsed LO signal. It will be noted that each spectral component produces a phase slope across the taps of the delay line which corresponds to one particular beam direction; that is, it compensates exactly for the phase slope of a signal received from that one direction. Consequently the mixer output frequency component corresponding to that local oscillator spectral line will be in phase for all mixers for a signal arriving at the array from the particular direction, and will produce a maximum output from the signal adder at that frequency. Signals arriving from other directions will produce less output at that frequency, but may of course yield greater output at one of the other output frequencies which corresponds to another of the local oscillator spectral lines producing a more favorable phase slope.

To process this scanning signal $$E_\Sigma$$

so as to achieve a single beam output signal which is electronically steerable continuously and to any desired position, it is necessary to generate a sampling signal $S_a$ for combination with the scanning signal in the manner described in reference to FIGURE 1. To enable such combination the sampling signal $S_a$ should be of the form $$S_a = e^{j\omega_1 t} \sum_m e^{jm\omega_s t} \frac{\sin N/2\left[\alpha - \frac{2\pi n}{N}\right]}{\sin 1/2\left[\alpha - \frac{2\pi n}{N}\right]} \quad (9)$$

or, more generally $$S_a = e^{j\omega_1 t} \sum_m e^{jm\omega_s t} \sum_n W_{sn} e^{jn\left[\alpha - \frac{2\pi m}{N}\right]} \quad (10)$$

where $\alpha$ is a desired element-to-element steering phase and $Ws_n$ is some impressed element-to-element weighting. The difference frequency output of the steering mixer then is $$E_s = E_\Sigma x S_a{}^*$$
$$= f(t)e^{j\omega_0 t} \sum_n \{W e_n W s_n e^{jn(kd\eta-\alpha)}$$
$$\times \left[\sum_m e^{jm\left[\omega_s t - \frac{2\pi n}{N}\right]}\right]\left[\sum_m e^{-jm\left[\omega_s t - \frac{2\pi n}{N}\right]}\right]\}$$
$$= f(t)e^{j\omega_0 t} \sum_n \{W e_n W s_n e^{jn(kd\eta-\alpha)} \sum_r \sum_s e^{j(r-s)\left[\omega_s t - \frac{2\pi n}{N}\right]}\} \quad (11)$$

A sampling signal $S_a$ of this form is illustrated at 51 in the third line of FIGURE 2, and the sampling mixer output which results from its combination with the scanning signal $$E_\Sigma$$

is illustrated at 53 in the fourth line of that figure. It will be noted that as shown the sampling mixer output $E_S$ is quite close to the desired final output form as shown at 55 on the last line in FIGURE 2, which results in part from the fact that undesired frequency outputs are attenuated by the inherent spectral weighting of the frequency multiplexed format of the scanning and sampling signals.

To complete the analysis, if the sampling mixer output is passed through the smoothing filter 35, only those terms of the double sum for which $r = s$ will be passed, so the smoothing filter will be given by $$E_0 = Nf(t)e^{j\omega_0 t}\sum_n W e_n W s_n e^{jn(kd\eta-\alpha)} \quad (12)$$

or for the case of $W e_n W s_n = 1$, $$E_0 = Nf(t)e^{j\omega_0 t}\frac{\sin N/2\ (kd\eta-\alpha)}{\sin 1/2(kd\eta-\alpha)} \quad (13)$$

Thus the output is seen to represent a receive beam which may be continuously steered between the particular beam positions associated with each of the spectral lines of the scanning signal $$E_\Sigma$$

To simultaneously form any desired number of additional beams, each of independently controllable width and pointing angle, it is necessary to duplicate only the sampling signal generator and other components below the points marked $x$–$x$ in FIGURE 1, the scanning signals $$E_\Sigma$$

for these additional beam forming circuits being taken from the power divider 31 as shown.

On choice of parameters, the frequency $f_S$ must be equal to or larger than the bandwidth B of the received signal, which may be filtered for bandwidth limiting if necessary to satisfy this requirement. If it is desired to scan a full 180° angle in space the required number of independent beams (Shannon samples of $\eta$) for a linear array is equal to the number of array elements, and the pulsed LO signal should have at least that number of array elements, and the pulsed LO signal should have at least that number of lines N. If only a reduced angular spectrum need be scanned, only sufficient LO spectral lines need be provided to cover that sector and the scanning and sampling signal bandwidths may be reduced correspondingly. Another advantage is that the elements of the array need not be equally spaced, provided the LO delay line taps are spaced along the delay line correspondingly to the spacing between elements of the array, and provided also that a set of fixed elemental phase compensators are introduced to accommodate the variation of phase of the LO carrier frequency $f_1$ with tap spacing.

As previously mentioned, the sampling signal circuit may take any of several forms of which one preferred embodiment is illustrated in FIGURE 1. FIGURES 3 and 4 illustrate two alternative embodiments which may be substituted for the sampling signal circuit of FIGURE 1 by connection across points $x$–$x$ in that figure. In FIGURE 3, the beam steering variable frequency oscillator 37 supplies an output to each two mixers 61 and 63, the second inputs to which are the local oscillator signal $E_{LO}$ and the scanning signal $$E_\Sigma$$

respectively. Mixer 61 transmits its output, which comprises the LO spectrum transposed in frequency by the signal from the beam steering variable frequency oscillator, through a beam shaping filter 41 like that of FIGURE 1, to another mixer 65. This mixer has as its second input the scanning signal $$E_\Sigma$$

also translated by this same beam steering frequency and filtered as at 45. These signals combine in mixer 65, the sampling mixer, to provide a sampling mixer output $E_S$ which is of the same form as the signal thus designated in FIGURE 1, and which is processed through a like smoothing filter 35 to again yield an output signal $E_0$ identical to that in the system of FIGURE 1.

FIGURE 4 illustrates another possible arrangement of these elements, in which the variable frequency oscillator signal translates the scanning signal $$E_\Sigma$$

as at 67 and then after beam shaping in filter 41 retranslates this signal in mixer 69 so that when combined in a third mixer 71 with the local oscillator signal $E_{LO}$ the resulting output is again a beam signal $E_0$ identical to that in the system of FIGURE 1.

To enable relaxation of stability requirements otherwise necessary for certain of the components in the steering signal generator system, and specifically for the tapped delay line and the beam steering oscillator, a closed loop beam steering control may be employed as illustrated in FIGURE 5. As there shown, inputs are taken from two different taps of the delay line, either from adjacent taps or, as illustrated, from the opposite end taps which in FIGURE 1 are shown with plus and minus values of $N-1/2$, and transmitted to mixers 73 and 75, respectively. A reference frequency generator 77 transmits an output at frequency $f_r$ directly to the mixer 75, and indirectly to mixer 73 through an adjustable phase shifter 79 which introduces a phase shift of magnitude variable for beam steering purposes.

The outputs of the two mixers 73 and 75 are combined in a subtraction circuit 81 and the difference then is combined in a third mixer 83 with a sampling signal $S_a$ which may be generated in the manner shown in FIGURE 1 and may be of the same form. The output of mixer 83 is compared against the reference frequency $f_r$ in a balanced detector 85, and any departure of the steering frequency from the reference frequency gives rise to an error signal on line 87 which connects to the variable frequency oscillator 37 in FIGURE 1 and controls its frequency in lieu of the beam steering control shown for this purpose in FIGURE 1.

As previously noted, the electronic scanning system of this invention lends itself well to use with ring arrays comprising either one or a number of concentric rings. In a planar array including a plurality of rings the invention permits placement of the elements in a radial-tangential arrangement which permits wider element spacing and more direct element thinning than the more commonly used rectangular elemental grid with linear row-column beam forming.

Figure 6:
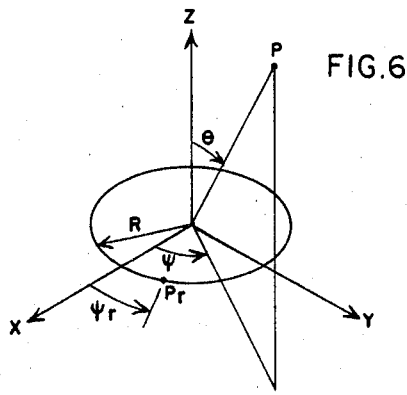
FIGURE 6 illustrates the ring coordinate system used in the description of the ring arrays of FIGURES 7 and 8.

FIGURE 6 illustrates phase relationships between elements in such a ring array. The elements are all considered to lie on a ring of radius R with the position of some one element on the ring designated by an angle $\psi_r$, measured around the ring from the X-axis. If a sinusoidal signal is received from a distant point, P, at an angular position defined by the coordinates $\theta$ and $\psi$ as illustrated, the relative phase of the signal received by the element at $P_r$ is given by $$\phi_r = kR \sin \theta \cos (\psi_r - \psi) \quad (14)$$

where $k$ again is equal to $2\pi/\gamma$.

Means for forming one or more receive beams for a ring array having this form of phase distribution is shown in FIGURE 7. The pulsed LO signal ($E_{LO}$) to the array in FIGURE 7 may be of the same form as the pulsed LO signal in the scanning system of FIGURE 1 and generated in essentially the same way, and the scanning signal $$E_\Sigma$$

in FIGURE 7 is likewise equivalent to the scanning signal output in FIGURE 1 and may be similarly though not identically processed. Here the sampling signal with which the scanning signal combines is of different form and differently produced as by a generator similar to that shown in FIGURE 8 and described hereinafter with reference thereto.

The received signal from each of the receptor elements 89–100 in FIGURE 7 combines in a mixer 101 with each harmonic of the pulsed LO signal as differentially delayed in a delay line 103 similar in function to the delay line 19 in FIGURE 1. The spaces between taps on the delay line 103 through which the pulsed LO signal is fed to the individual mixers correspond to the relative angles between the receptor elements from which they receive their signal inputs. The total transmission time (T) around the ring preferably is made less than $1/B$ where B is the bandwidth of the received signals, and where necessary to keep the bandwidth sufficiently narrow to satisfy this criterion a bandpass filter may be interposed in the line between each of the receptor elements 89–100 and its associated mixer 101 for bandwidth limiting.

The outputs of the elemental mixers are summed in an adder 105, the sum output being designated as the scanning signal $$E_\Sigma$$

and further processed similarly to the correspondingly designated signal in the scanning system of FIGURE 1. If preferred this summing by adder 105 could be done by means of additive taps on a second transmission or delay line similar to the delay line 103, or it may as shown be done by simple direct summing.

With a ring array of this configuration the individual element signals are as follows:

$$E_r = f(t) e^{j\omega_0 t} e^{jkR \sin \theta \cos (\psi - \phi)} \quad (15)$$

The pulsed LO signal at the delay line taps can be written as $$_r E_{LO} = e^{j\omega_1 \left(t - \frac{\phi}{\omega_s}\right)} \sum e^{jn(\omega_s t - \phi)} \quad (16)$$

The mixer output summation can be shown to be of the following closed form $$E_\Sigma = 2\pi f(t) e^{j(\omega_0 + \omega_1)t} e^{jkR \sin \theta \cos (\omega_s t + \psi)} \quad (17)$$

This may be seen to be the incident signal with a sinusoidal phase modulation whose timing depends upon the incident signal direction $\psi$, as expected. It is to be noted that the $\theta$ coordinate information is also included in this signal in terms of the peak value of phase modulation.

The sampling signal is of the form $$S_a = e^{j\omega_1 t} e^{jkR \sin \theta_0 \cos (\omega_s t - \psi_0)}$$

$$= e^{j\omega_1 t} \sum j^n J_n(kR \sin \theta_0) e^{jn(\omega_s t - \psi_0)} \quad (18)$$

which when mixed with the scanning signal $$E_\Sigma$$

and the product passed through the smoothing filter yields $$E_0 = 2\pi f(t) e^{j\omega_0 t} \sum_n J_n(kR \sin \theta) J_n(kR \sin \theta_0) e^{jn(\psi_0 - \psi)}$$

$$= 2\pi f(t) e^{j\omega_0 t} J_0[kRg(\theta, \theta_0, \psi - \psi_0)] \quad (19)$$

The time sampled ring system operative in the manner just described affords significant advantages over previous electronically scanned ring arrays such, for example, as described in the aforementioned Patent No. 2,852,772 to Gitzendanner, in applications requiring a number of simultaneous output beam positions. This advantage accrues from the fact that the local oscillator signal here is not a function of $\theta$, as it is in the case of prior ring array scanning systems. Therefore, only a single pulsed LO signal and one set of elemental mixers is needed for all or many simultaneous output beam positions by using a suitable number of sampling signal generators and mixers. The total number of components required for multiple beam outputs is therefore greatly reduced.

A two or three dimensional array may readily be formed from a series of rings lying in one or a number of parallel planes and having ring centers located on a common perpendicular to the planes of the rings. This geometry would cover circular planar apertures, cones, right circular cylinders, and spheres. Implementation of the circular planar aperture composed of concentric rings is especially straightforward using the electronic scanning system of this invention, and will be further described.

FIGURE 8 illustrates the general arrangement for this planar array of a plurality of concentric rings, which for the reason explained hereinafter preferably are of radii increasing as integral multiples of the radius of the innermost ring. The beam forming signals for each of the rings 1–6 of the array, designated generally by reference numeral 107 in FIGURE 8, are supplied from a common source, a pulsed LO signal generator 109 which may be similar to that of FIGURE 1. The distribution of signals from this generator may as shown be made to a delay line (not shown) which is individual to each ring of the array as in the case of the single ring array of FIGURE 7, or alternatively a single delay line may be used to supply all the rings with taps at appropriate points for each of the mixers of each ring. The summing of elemental mixer outputs is done independently for each ring, as discussed above in reference to FIGURE 7, and the summed output signal for each ring is transmitted to one of a bank of mixers 111. Where multiple beams are to be formed by the array, a power divider may be interposed in the connection between each ring of array 107 and its associated mixer 111, in a manner similar to that shown for power divider 31 in FIGURE 1.

The output of the mixers may be directly summed as in adder 113 and passed through a common smoothing filter 115. The sampling signal requirement for this multiple ring array is for a plurality of separate sampling signals of peak phase modulation linearly increasing with ring number, starting at the center ring designated 1. This requirement results from the differing ring radii and the consequent difference in required steering signal phase modulation index for each. To supply a sampling signal set of this character, a signal of the basic scanning frequency $f_s$ is taken from the generator 109 and passed through an adjustable phase shifter 117 and an adjustable attenuator 119 which provide phase and amplitude control for beam steering and beam width adjustment, respectively.

Undesired harmonics in the output $f_s$ signal then are filtered at 121 to produce a purely sinusoidal $f_s$ signal which is transmitted to the linear phase modulator 123, in which it produces a linear phase modulation of a carrier signal at frequency $f_1/M$ from a local oscillator 125. Since the range of linearity of practical phase modulators may be much less than $\pi$ radians, the phase modulator output is then frequency multiplied by a factor M as at 127 in order to produce linear phase modulation of the output which approaches the maximum peak phase modulation of nearly $\pi$ radians which would be required for the innermost ring of radius approximately $\lambda/2$. For successive rings whose radii increase as integral multiples of the radius of the innermost ring, the appropriate sampling signals must then have successively increasing peak phase deviation, with the peak difference between adjacent signals equal to the peak deviation for the inner ring. This is provided by the arrangement shown, where $\alpha$ is the first ring phase modulation, and the phase modulation for each of the other rings is the product of $\alpha$ times the ring number.

To produce these signals the local oscillator signal $f_1$ after phase modulation at 123 and frequency multiplication at 127 is heterodyned in mixer 131 with a signal at frequency $f_2$ from another stable frequency source 129, the upper sideband at frequency $f_1+f_2$ with phase modulation $\alpha$ being selected as the first ring sampling signal output to the scanning signal mixer 111. The $f_1$ signal is divided and supplied also through a second frequency multiplier 133 to a modulation increasing ladder network comprising a plurality of mixers 135–139 interconnected as shown.

By mixing the first ring output signal $$f_1-f_2/\alpha$$

in mixer 135 with $$f_1/\alpha, \text{ an } f/2\alpha$$

signal is produced and when this is again mixed in mixer 137 with the $$f_1/0$$

signal there results an $$f_2/2\alpha$$

signal suitable for use as the sampling signal for the second ring. By successive repetition of this double mixing process, the necessary number of sampling signal outputs can be obtained with the desired successively increasing phase modulation of the form $n\alpha$. For further detail on ladder networks of this general kind reference is made to U.S. Patent No. 3,153,788—Washburne.

When multiple beams are required which have the same steering value of $\theta_0$, it may be noted that suitable sampling signals for different values of $\psi_0$ may be obtained by simply delaying the initial set of ring sampling signals by an amount of $$\tau=\frac{\psi_0 T}{2\pi}$$

consequently, it is not necessary to build complete additional sampling generators for this case. For certain sets of values of $\theta_0$, such that the peak phase modulations for the innermost ring are integral multiples of a common value, the generation of appropriate ring sampling signals may also be performed by adding only certain mixers and amplifiers of the modulation increasing chain comprising mixers 135–139, without duplicating the phase modulator 123 and multipliers 127 and 129.

For the circular aperture, planar array configuration just described, the potential advantage of ring beam forming over the conventional row-column beam forming approach lie in the simple amplitude weighting of successive rings, say with circular Taylor weights, and in the possibility of relatively large deterministic array thinning even to the extent of omitting complete rings without detrimental sidelobe effects. Thinning by rings would of course reduce directly both the amount of elemental and beam forming signal equipment to a significant extent.

It should be noted that the general ring scanning techniques just described may be used in reverse to generate a set of signals suitable for forming a transmitted beam with a single or multiple ring array of transmitting elements. In this case the beam forming signal is fed in common to all elemental mixers while the LO signal is fed in the same manner as for reception. The mixer outputs are then narrow band filtered and connected to the radiating elements, either directly or through suitable amplifiers.

While in this description of the invention only a presently preferred embodiment has been illustrated and described by way of example, many modifications will occur to those skilled in the art and it therefore should be understood that the appended claims are intended to cover all such modifications as fall within the true spirit and scope of the invention.

What is claimed as new and desired to be secured by Letters Patent of the United States is:

1. Electronic scanning means for forming and steering a wave energy receive beam, comprising:
   (a) a plurality of wave energy receptor elements disposed in ordered array;
   (b) a pulsed local oscillator including local oscillator and pulse generator means operative to generate a plurality of signals of frequencies harmonically related to the basic frequency of the local oscillator;
   (c) a transmission line having said harmonically related signals applied thereto and including a plurality of output taps across which there appears for each input harmonic order a different set of beam forming signals with phase slope across each such set determined in accordance with the harmonic order from which it derives;
   (d) a plurality of mixers each combining the received signal from one of said receptor elements with the beam forming signals from one of said transmission line output taps;
   (e) adder means for combining the signal products of said mixers to derive a scanning signal;
   (f) sampling signal generator means responsive to at least one of the harmonically related frequencies generated in said pulsed local oscillator means to produce a sampling signal;
   (g) mixer means having said scanning and sampling signals applied thereto and operative to combine said signals to form an output beam signal; and
   (h) means for varying at least one of said scanning and sampling signals as combined with the other to thereby effect control of beam width and pointing angle.

2. Electronic scanning means as defined in claim 1 wherein said sampling signal generator comprises a variable frequency beam steering oscillator and mixer means for translating the frequencies of at least one of said scanning and pulsed local oscillator signals by the steering oscillator frequency, and further comprises beam shaping filter means for limiting the number of harmonics in the translated signal frequencies passed to said mixer means in which the scanning and sampling signals combine to form said output beam signal, to thus effect control of beam pointing angle and beam width, respectively.

3. Electronic scanning means as defined in claim 1 wherein said sampling signal generator comprises a second local oscillator for generating a sampling signal carrier frequency and phase modulator means for varying the phase of such carrier in accordance with a control signal input to the phase modulator means, and further comprises adjustable phase shifter and adjustable attenuator means through which said pulsed local oscillator signal is applied to said phase modulator control signal input and by which beam steering and beam width control are respectively effected.

4. Electronic scanning means for forming and steering a wave energy receive beam, comprising:
   (a) a plurality of wave energy receptor elements disposed in ordered array;
   (b) a beam forming signal generator including means operative to generate a plurality of signals of harmonically related frequencies and to derive from the signals of each harmonic order a set of beam forming signals with each such set having a phase slope across the set determined in accordance with its frequency;
   (c) scanning signal generating means including means for mixing the received signal from each said receptor element with one of said beam forming signals of each of the harmonically related frequencies thereof, and further including means for summing the signals thus mixed to yield a scanning signal;

(d) means for deriving a sampling signal from one or more of the signals generated in said beam forming signal generator;

(e) means for combining said scanning and sampling signals to produce an output beam signal; and (f) means for processing at least one of said scanning and sampling signals as combined with the other for control of beam width and pointing angle.

5. Electronic scanning means as defined in claim 4 wherein said means for deriving said sampling signal comprises a variable frequency oscillator and mixer means for translating the frequencies of either or both of said scanning signal and said beam forming signal by the variable frequency signal produced thereby.

6. Electronic scanning means as defined in claim 5 further comprising frequency control means for said variable frequency oscillator and wherein said frequency control means includes adjustable phase shifter means for control of beam pointing angle.

7. An electronically scanned multiple ring array, comprising:

(a) a plurality of wave energy receptor elements arranged in ordered array to form two or more concentric rings each including a plurality of receptor elements disposed about its circumference;

(b) pulsed local oscillator means operative to generate a plurality of signals of harmonically related frequencies;

(c) a transmission line having said harmonically related signals applied thereto and including a plurality of output taps across which there appears for each input harmonic order a different set of output signals with phase slope across the set determined in accordance with the harmonic order from which it derives;

(d) a plurality of mixers each combining the received signal from one of said receptor elements with the output from one of said transmission line taps;

(e) adder means individual to each of said receptor element rings for combining the signal products of all said mixers accepting received signals from that ring, to produce a scanning signal for each ring;

(f) sampling signal generator means responsive to at least one of the harmonically related frequencies generated in said pulsed local oscillator means to produce a plurality of phase modulated sampling signals of number equal to the number of rings and with peak phase modulation increasing with ring number; and (g) mixer means having said scanning and sampling signals applied thereto and operative to combine said signals to form an output beam signal.

8. A multiple ring array as defined in claim 7 wherein said sampling signal generator means comprises first and second local oscillators, a phase modulator, and a plurality of mixers interconnected in a ladder network with alternate ones of said mixers receiving a first input from said first local oscillator directly and the others receiving an input therefrom through said phase modulator, with each said mixer except the first having as a second input thereto the output of the next preceding mixer, and with said first mixer receiving a second input from said second local oscillator.

9. A multiple ring array as defined in claim 7 wherein said sampling signal generator means comprises a sampling signal carrier frequency generator, a phase modulator for varying the phase of such carrier in accordance with a control signal input, and means including an adjustable phase shifter and an adjustable attenuator for generating the control signal input to said phase modulator and varying the control signal phase and amplitude to effect array beam steering and beam width control, respectively.

References Cited

UNITED STATES PATENTS

| | | | |
|---|---|---|---|
| 2,852,772 | 9/1958 | Gitzendanner | 343—100 |
| 3,026,475 | 3/1962 | Applebaum. | |
| 3,308,456 | 3/1967 | Levenson et al. | 343—100 X |

RICHARD A. FARLEY, Primary Examiner

R. E. BERGER, Assistant Examiner